(12) United States Patent
Song et al.

(10) Patent No.: US 10,409,423 B2
(45) Date of Patent: Sep. 10, 2019

(54) OPTICAL TOUCH SUBSTRATE, IN-CELL TOUCH PANEL AND DISPLAY DEVICE

(71) Applicants: BOE Technology Group Co., Ltd., Beijing (CN); Beijing BOE Display Technology Co., Ltd., Beijing (CN)

(72) Inventors: Jiajia Song, Beijing (CN); Dianzheng Dong, Beijing (CN); Junwei Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/533,171

(22) PCT Filed: Feb. 4, 2016

(86) PCT No.: PCT/CN2016/073453
§ 371 (c)(1),
(2) Date: Jun. 5, 2017

(87) PCT Pub. No.: WO2017/049837
PCT Pub. Date: Mar. 30, 2017

(65) Prior Publication Data
US 2017/0371440 A1 Dec. 28, 2017

(30) Foreign Application Priority Data
Sep. 24, 2015 (CN) .......................... 2015 1 0618520

(51) Int. Cl.
G06F 3/042 (2006.01)
G02F 1/1343 (2006.01)
(Continued)

(52) U.S. Cl.
CPC ............ G06F 3/042 (2013.01); G02F 1/1343 (2013.01); G06F 3/044 (2013.01); G06F 3/0412 (2013.01);
(Continued)

(58) Field of Classification Search
CPC ....... G02F 1/13338; G06F 2203/04103; G06F 2203/04111
See application file for complete search history.

(56) References Cited

U.S. PATENT DOCUMENTS 8,139,041 B2    3/2012  Na
2001/0022632 A1*  9/2001  Umemoto ........... G02F 1/13338
                                                    349/12
(Continued)

FOREIGN PATENT DOCUMENTS

CN    101726891 A    6/2010
CN    103345338 A    10/2013
(Continued)

OTHER PUBLICATIONS

International Search Report and Written Opinion for International Application No. PCT/CN2016/073453, dated Jun. 29, 2015, 7 pages.
(Continued)

Primary Examiner — Chun-Nan Lin
(74) Attorney, Agent, or Firm — Westman, Champlin & Koehler, P.A.

(57) ABSTRACT

An optical touch substrate, an in-cell touch panel and a display device are disclosed. The optical touch substrate includes a base substrate, a light shielding matrix and a plurality of pixel regions defined by the light shielding matrix. The light shielding matrix includes a plurality of first optical touch electrodes and a plurality of second optical touch electrodes arranged to cross each other. The first
(Continued)

optical touch electrodes are insulated from the second optical touch electrodes, and at least one optical touch electrode of the plurality of first optical touch electrodes and the plurality of second optical touch electrodes includes a light sensing layer and a conductive layer provided in a stacked manner. A sensing signal on each optical touch electrode changes as an intensity of light irradiated to a corresponding light sensing layer changes.

20 Claims, 7 Drawing Sheets

(51) Int. Cl.
*G06F 3/041* (2006.01)
*G06F 3/044* (2006.01)
*G02F 1/1333* (2006.01)

(52) U.S. Cl.
CPC *G02F 1/13338* (2013.01); *G06F 2203/04112* (2013.01)

(56) References Cited

U.S. PATENT DOCUMENTS

| | | | |
|---|---|---|---|
| 2010/0090984 A1* | 4/2010 | Na | G06F 3/0412 345/175 |
| 2011/0241989 A1* | 10/2011 | Park | G06F 3/0386 345/158 |
| 2012/0044202 A1* | 2/2012 | Ishizaki | G02F 1/13338 345/174 |
| 2012/0262412 A1* | 10/2012 | Guard | G06F 3/044 345/174 |
| 2013/0044074 A1* | 2/2013 | Park | G02F 1/13338 345/174 |
| 2013/0249839 A1 | 9/2013 | Lee et al. | |
| 2013/0265247 A1 | 10/2013 | Yang et al. | |
| 2013/0271707 A1* | 10/2013 | Sakamoto | G02F 1/139 349/106 |
| 2013/0307826 A1* | 11/2013 | Ma | G06F 3/0428 345/175 |
| 2014/0062906 A1 | 3/2014 | Park | |
| 2014/0111480 A1* | 4/2014 | Kim | G06F 3/016 345/175 |
| 2014/0145976 A1* | 5/2014 | Tang | G06F 3/0412 345/173 |
| 2014/0232950 A1* | 8/2014 | Park | G06F 3/044 349/12 |
| 2015/0015517 A1 | 1/2015 | Zhao | |
| 2015/0325171 A1* | 11/2015 | Zhou | G09G 3/3233 345/80 |
| 2016/0011688 A1 | 1/2016 | Wang | |
| 2017/0277292 A1* | 9/2017 | Park | G06F 3/044 |

FOREIGN PATENT DOCUMENTS

| | | |
|---|---|---|
| CN | 103365508 A | 10/2013 |
| CN | 103823601 A | 5/2014 |
| CN | 103914169 A | 7/2014 |
| CN | 104216578 A | 12/2014 |
| CN | 204288180 U | 4/2015 |
| CN | 105117075 A | 12/2015 |
| CN | 204945980 U | 1/2016 |
| JP | 2008-77188 A | 4/2008 |

OTHER PUBLICATIONS

English translation of Box V of the Written Opinion of the International Search Report for International Application No. PCT/CN2016/073453, 2 pages.
First Office Action from Chinese Patent Application No. 201510618520.3, dated Jul. 11, 2017, 16 pages.
English translation of International Search Report and Written Opinion for International Application No. PCT/CN2016/073453, dated Jun. 29, 2015, 7 pages.
Second Office Action from Chinese Patent Application No. 201510618520.3, dated Sep. 29, 2017, 6 pages.

* cited by examiner

OPTICAL TOUCH SUBSTRATE, IN-CELL TOUCH PANEL AND DISPLAY DEVICE

CROSS-REFERENCE TO RELATED APPLICATION

This application is a Section 371 National Stage Application of International Application No. PCT/CN2016/073453, filed on 4 Feb. 2016, which published as WO 2017/049837 A1 on 30 Mar. 2017, and claims priority to Chinese Patent Application No. 201510618520.3 filed on Sep. 24, 2015 in the State Intellectual Property Office of China, the disclosures of which are incorporated in entirety herein by their reference.

BACKGROUND

Technical Field

The present disclosure relates to a field of display technology, and more particularly, to an optical touch substrate, an in-cell touch panel and a display device.

Description of the Related Art

Touch panels have been widely used in people's daily life as display technology develops. At present, the touch screens may be divided into types of Add-on Mode Touch Panel, On-Cell Touch Panel and In-cell Touch Panel according to their structural constructions. Among them, the in-cell touch panel allows a touch sensing function of the touch panel to be embedded in a liquid crystal display panel, it not only can reduce an overall thickness of a module, but also greatly reduce a production cost of the touch panel, thus the in-cell touch panel is favored by various panel manufacturers.

The touch panels may include a resistive touch panel, a capacitive touch panel and an optical touch panel. Among them, the resistive touch panel and the capacitive touch panel are relatively suitable for an application in small and medium sized display panels which may be touched proximally, but not suitable for an application in a large sized display panel which is intended to be remotely controlled by a finger. In contrast, the optical touch panel may achieve touch positioning by changing light intensity. Therefore, it is possible for the optical touch panel to not only achieve a proximity touch function, but also achieve a remote touch function through optical positioning by a laser pointer.

SUMMARY

In an embodiment of the present disclosure, there is provided an optical touch substrate, comprising a base substrate, a light shielding matrix and a plurality of pixel regions defined by the light shielding matrix, the light shielding matrix comprises a plurality of first optical touch electrodes and a plurality of second optical touch electrodes arranged to cross each other, the first optical touch electrodes being insulated from the second optical touch electrodes, and at least one optical touch electrode of the plurality of first optical touch electrodes and the plurality of second optical touch electrodes comprises a light sensing layer and a conductive layer provided in a stacked manner; and a sensing signal on each optical touch electrode changes as an intensity of light irradiated to a corresponding light sensing layer changes.

In an embodiment, the first optical touch electrodes are located in the same layer as the second optical touch electrodes; and the first optical touch electrode comprises a plurality of first optical touch sub-electrodes independent from each other, the first optical touch sub-electrodes are arranged to be respectively spaced apart from the second optical touch electrodes, the conductive layers of two first optical touch sub-electrodes belonging to one same first optical touch electrode and respectively located at two sides of the second optical touch electrode are electrically connected to each other via a connection line in a bridging manner.

In an embodiment, the optical touch substrate further comprises an insulation layer located between the conductive layer and the connection line, and the connection line is electrically connected to the conductive layer via a via hole extending through the insulation layer.

In an embodiment, the first optical touch electrodes and/or the second optical touch electrodes each have a grid structure.

In an embodiment, a material of the conductive layer is an opaque metallic material.

In an embodiment, the light sensing layer includes block structures distributed uniformly and spaced apart from each other.

In an embodiment, an orthographic projection of the conductive layer onto the base substrate overlaps an orthographic projection of the light sensing layer onto the base substrate.

In an embodiment, the optical touch substrate is an array substrate, and the conductive layer is located between the light sensing layer and the base substrate.

In an embodiment, the optical touch substrate further comprises a thin film transistor between the conductive layer and the base substrate, a data line extending in a column direction and a gate line extending in a row direction, and an orthographic projection of the light shielding matrix onto the base substrate covers orthographic projections of the data line, the gate line and the thin film transistor onto the base substrate.

In an embodiment, when the first optical touch electrodes are located in the same layer as the second optical touch electrodes, and the first optical touch electrodes extend in a row direction and the second optical touch electrodes extend in a column direction, the connection line is located in the same layer as the gate line; or when the first optical touch electrodes are located in the same layer as the second optical touch electrodes, and the first optical touch electrodes extend in a column direction and the second optical touch electrodes extend in a row direction, the connection line is located in the same layer as the data line.

In an embodiment, the first optical touch electrodes and/or the second optical touch electrodes each have a strip structure.

In an embodiment, an orthographic projection of the connection line onto the base substrate is located within a region where an orthographic projection of the light shielding matrix onto the base substrate is located.

In an embodiment, the optical touch substrate is a color film substrate, and the light sensing layer is located between the conductive layer and the base substrate.

In an embodiment of the present disclosure, there is provided an in-cell touch panel comprising the above optical touch substrate according to the embodiments of the present disclosure.

DETAILED DESCRIPTION OF PREFERRED EMBODIMENTS

Figure 1A:
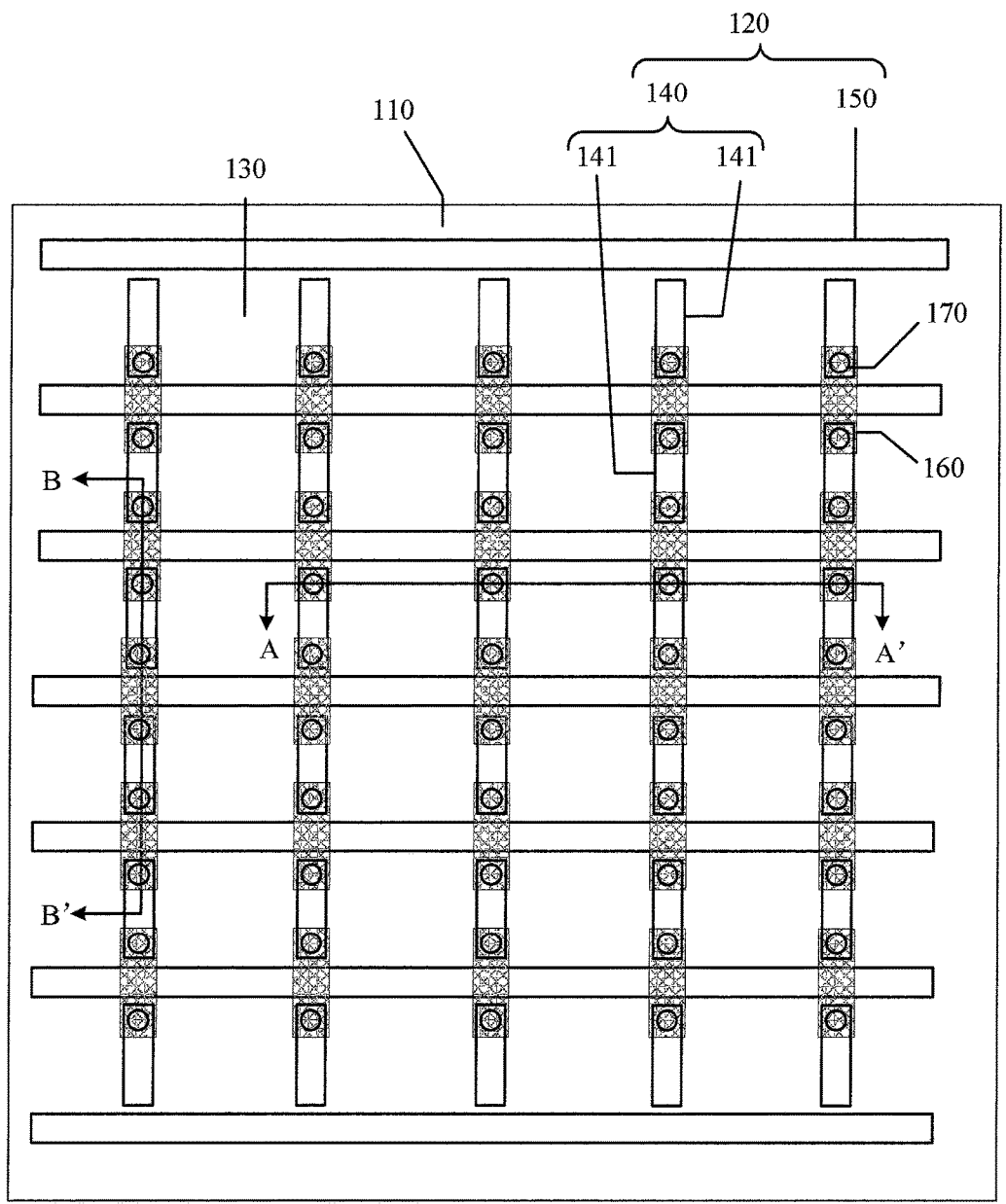
FIGS. 1a to 1d are respectively structural schematic top views of optical touch substrates according to embodiments of the present disclosure.

In order to make the objects, technical solutions and advantages of the present disclosure more clear, specific implementations of the optical touch substrate, the in-cell touch panel and the display device according to embodiments of the present disclosure will be described below in detail with reference to the accompanying drawings.

Thicknesses and shapes of layers in the drawings do not indicate the real scale of the optical touch substrate, and they are only intended to be illustrative of the present disclosure.

Unless otherwise specified, technical terms or scientific terms used herein should be interpreted as having a general meaning known to those skilled in the art. Wordings "first", "second" and the like used in the specification and claims of the present disclosure are not intended to raise any limitation on aspects of order, quantity or importance, but only to distinguish between different constituent parts. Similarly, wording "one", "a", "an" and the like do not limit the quantity of items, but mean to have at least one item. The terms "connect", "joint" and the like are not limited to physical or mechanical connection, but may further include an electrical connection, regardless of direct connection or indirect connection. The terms "upper", "lower", "left", "right" and the like are only used to represent a relative positional relationship, and if the absolute position of the item to be described changes, the relative position relation will accordingly change.

Figure 1B:
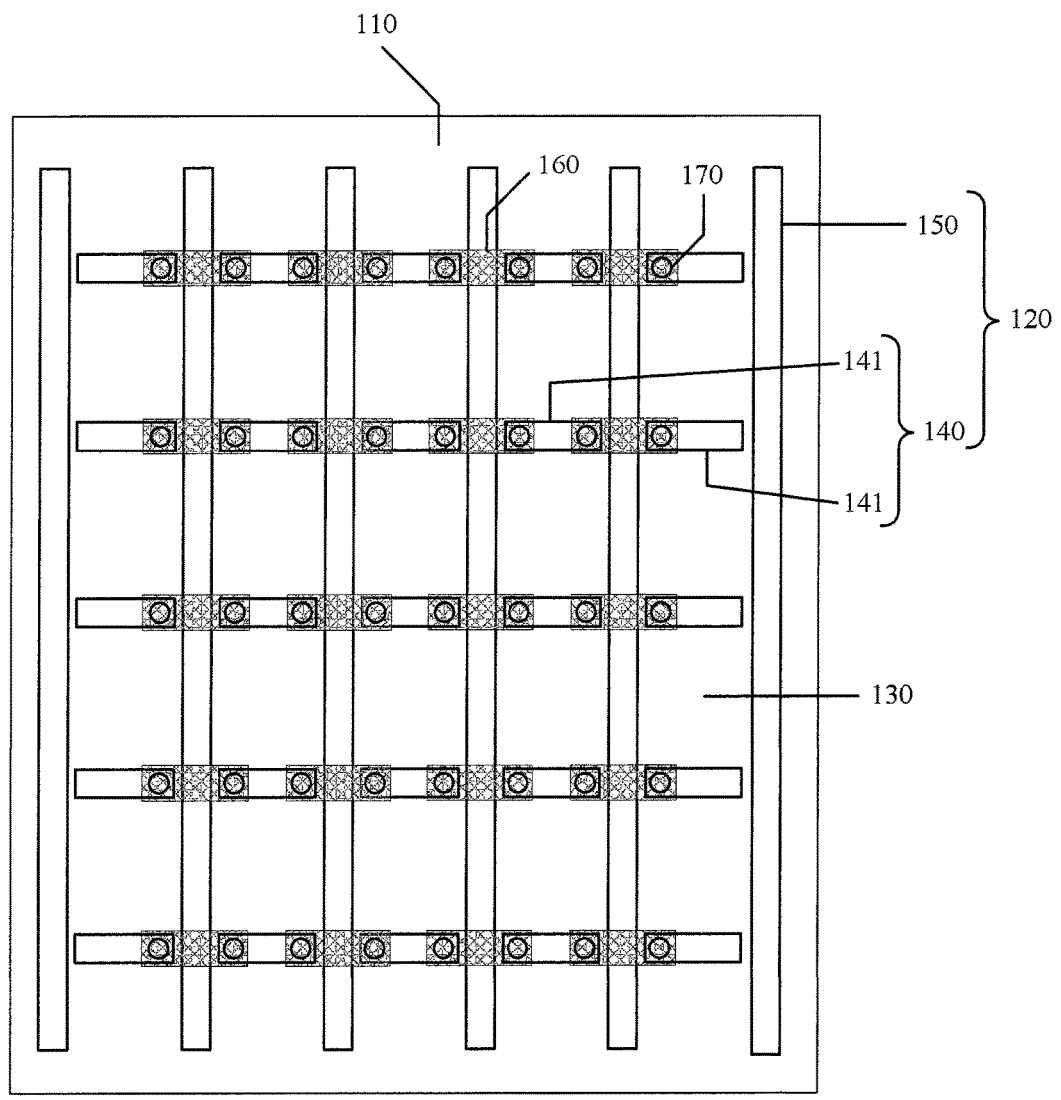

As shown in FIGS. 1a and 1b, an optical touch substrate according to an embodiment of the present disclosure comprises a base substrate 110, a light shielding matrix 120 and a plurality of pixel regions 130 defined by the light shielding matrix 120. The light shielding matrix 120 comprises a plurality of first optical touch electrodes 140 and a plurality of second optical touch electrodes 150 arranged to cross each other, and the first optical touch electrodes 140 are insulated from the second optical touch electrodes 150. As shown in FIGS. 2a to 2d, at least one optical touch electrode of the plurality of first optical touch electrodes 140 and the plurality of second optical touch electrodes 150 comprises a light sensing layer 142 and a conductive layer 143 provided in a stacked manner; a sensing signal on each optical touch electrode changes as an intensity of light irradiated to a corresponding light sensing layer 142 changes.

The optical touch substrate according to the embodiments of the present disclosure comprise a base substrate, a light shielding matrix and a plurality of pixel regions defined by the light shielding matrix, the light shielding matrix comprises a plurality of first optical touch electrodes and a plurality of second optical touch electrodes arranged to cross each other, the first optical touch electrodes are insulated from the second optical touch electrodes, and at least one optical touch electrode of the plurality of first optical touch electrodes and the plurality of second optical touch electrodes comprises a light sensing layer and a conductive layer provided in a stacked manner. A sensing signal on each optical touch electrode changes as an intensity of light irradiated to a corresponding light sensing layer changes. As such, touch positioning may be achieved by means of changing the intensity of light irradiated to the light sensing layer, it is possible to not only achieve a proximity touch function, but also achieve a remote touch function through optical positioning by a laser pointer. Therefore, it is more suitable for an application in a large sized display panel which is intended to be remotely controlled by a finger, in contrast to the resistive touch panel and the capacitive touch panel.

In an embodiment, the light shielding matrix is intended for achieving a light shielding function, thus in the above optical touch substrate according to the embodiments of the present disclosure, the conductive layer is optionally made from an opaque metallic material, but it is not limited thereto.

In the conventional display panels, a black matrix having a light shielding function is generally provided between adjacent pixel regions. Therefore, in the above optical touch substrate according to the embodiments of the present disclosure, an existing black matrix may be multiplexed as a conductive layer in the optical touch electrode, then a light sensing layer is provided on the conductive layer, that is, it is such arranged that the conventional black matrix is divided into conductive layers corresponding to the first optical touch electrodes and the second optical touch electrodes respectively and insulated from each other. Therefore, in the optical touch substrate according to the embodiments of the present disclosure, the pattern of the conductive layers may be formed by changing the pattern of the conventional black matrix, thus it is not required to add any additional processes for preparing the conductive layer, thereby saving the production cost and improving the production efficiency. In addition, since the black matrix is located between adjacent pixel regions in the prior art, the pixel regions will not be occupied by the black matrix if the black matrix multiplexes as the conductive layer in the light shielding matrix in the present disclosure. As a result, the optical touch function may be achieved without reducing a pixel aperture ratio, and the conductive layer of the light shielding matrix has a light shielding function and thus may shield light, which comes from the side of the conductive layer opposite to the light sensing layer, from entering the light sensing layer.

In an embodiment, in the above optical touch substrate according to the embodiments of the present disclosure, the first optical touch electrode may be arranged as an optical touch sensing electrode, and the second optical touch electrode may be arranged as an optical touch driving electrode. Alternatively, in another embodiment, the first optical touch electrode may be arranged as an optical touch driving electrode, and the second optical touch electrode may be arranged as an optical touch sensing electrode, which is not limited herein.

In the above optical touch substrate according to the embodiments of the present disclosure, the first optical touch electrodes may be located in the same layer as the second optical touch electrodes, or located in a different layer from the second optical touch electrodes, which is not limited herein. If the first optical touch electrodes is located in the same layer as the second optical touch electrodes, the patterns of the first optical touch electrodes and the second optical touch electrodes may be formed through only one patterning process, but it is required to electrically connect one of the first optical touch electrodes and the second optical touch electrodes to each other in a bridging manner. If the first optical touch electrodes is located in a different layer from the second optical touch electrodes, it is not required to additionally electrically connect the first optical touch electrodes or the second optical touch electrodes to each other in a bridging manner, but it is required to form the patterns of the first optical touch electrodes and the second optical touch electrodes through two patterning processes.

In an embodiment, in the above optical touch substrate according to the embodiments of the present disclosure, as shown in FIGS. 1a and 1b, the first optical touch electrodes 140 is located in the same layer as the second optical touch electrodes 150, the first optical touch electrode 140 comprises a plurality of first optical touch sub-electrodes 141 independent from each other, the first optical touch sub-electrodes 141 are respectively spaced apart from the second optical touch electrodes 150, the conductive layers 143 of two first optical touch sub-electrodes 141 belonging to one same first optical touch electrode 140 and respectively located at two sides of the second optical touch electrode 150 are electrically connected to each other via a connection line 160 in a bridging manner.

In an embodiment, in the above optical touch substrate according to the embodiments of the present disclosure, as shown in FIGS. 2a to 2d, an insulation layer 144 is provided between the conductive layer 143 and the connection line 160, the connection line 160 is electrically connected to the conductive layer 143 via a via hole 170 extending through the insulation layer 144, and the connection line 160 is insulated from the second optical touch electrode 150.

In the above optical touch substrate according to the embodiments of the present disclosure, the conductive layers may be connected to each other through one connection line or several connection lines, depending on a coverage range of one optical touch electrode. For example, if one optical touch electrode is only located between two adjacent rows or columns of pixel regions, then the conductive layers of the optical touch electrode may be electrically connected to each other through one connection line; if one optical touch electrode is located between a plurality of rows or columns of pixel regions (greater than two rows or columns of pixel regions), then the conductive layers of the optical touch electrode may be electrically connected to each other through one connection line or several connection lines.

In an embodiment, in the above optical touch substrate according to the embodiments of the present disclosure, as shown in FIGS. 1a and 1b, the first optical touch electrodes 140 and/or the second optical touch electrodes 150 each have a strip structure. As shown in FIGS. 1a and 1b, the first optical touch electrode 140 consisting of the first optical touch sub-electrodes 141 and the second optical touch electrodes 150 are arranged between two adjacent rows or columns of pixel regions 130.

Figure 1C:
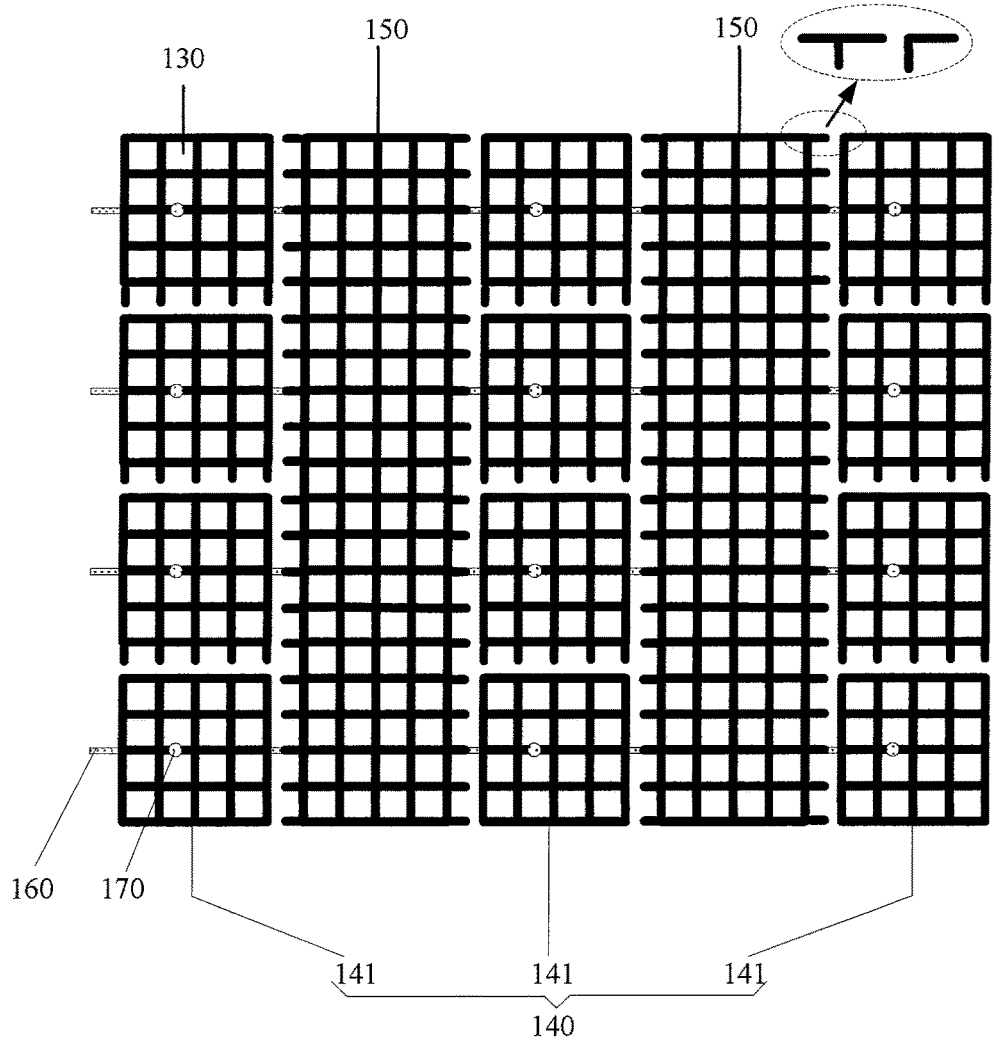
Figure 1D:
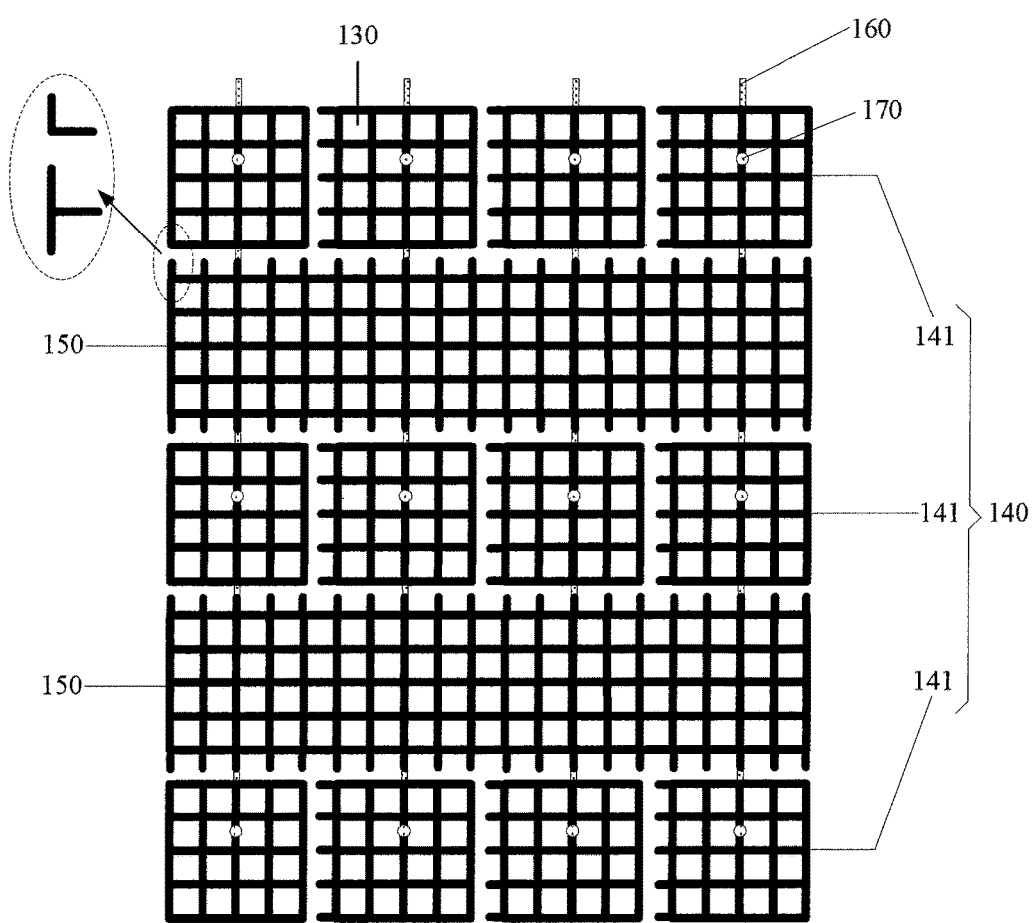

Alternatively, in another embodiment, in the above optical touch substrate according to the embodiments of the present disclosure, as shown in FIGS. 1c and 1d, the first optical touch electrodes 140 and/or the second optical touch electrodes 150 each have a grid structure. As shown in FIGS. 1c and 1d, the first optical touch electrode 140 consisting of the first optical touch sub-electrodes 141 is of a grid structure which has a block shape as a whole and is arranged among a plurality of rows and columns of pixel regions 130, and the second optical touch electrode 150 is of a grid structure which has a strip shape as a whole and is arranged among a plurality of rows and columns of pixel regions 130.

In the above optical touch substrate according to the embodiments of the present disclosure, the greater the coverage area of the light sensing layer is (that is, the greater the area of the touch region is), the higher the touch accuracy is. Therefore, in an embodiment, an orthographic projection of the conductive layer onto the base substrate overlaps an orthographic projection of the light sensing layer onto the base substrate, so that the area of the light sensing layer is maximized.

Figure 3:
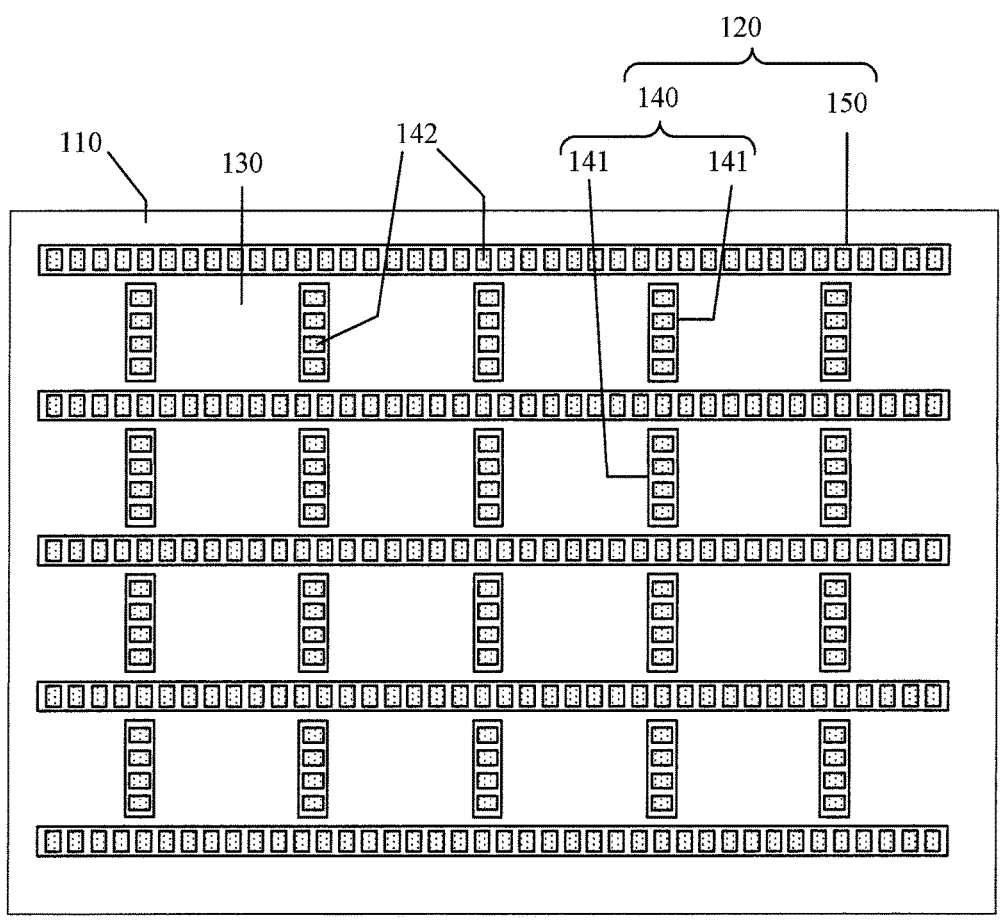
FIG. 3 is a structural schematic top view of a light sensing layer of an optical touch substrate according to an embodiment of the present disclosure.

Of course, in another embodiment, in the above optical touch substrate according to the embodiments of the present disclosure, as shown in FIG. 3, the light sensing layer 142 may have block structures distributed uniformly and spaced apart from each other. The pattern of the block structures may be chosen from rectangle, square, circle and any other regular patterns, or may be an irregular pattern, which is not limited herein.

The optical touch substrate according to the embodiments of the present disclosure may be applied in a display panel, and the display panel may be a liquid crystal display panel or an organic electroluminescent display panel, which is not limited herein.

The display panel generally consists of an array substrate and a color film substrate arranged opposite to the array substrate, therefore, if the above optical touch substrate is applied in the display panel, then the optical touch substrate may act as an array substrate or a color film substrate, which is not limited herein.

Figure 2A:
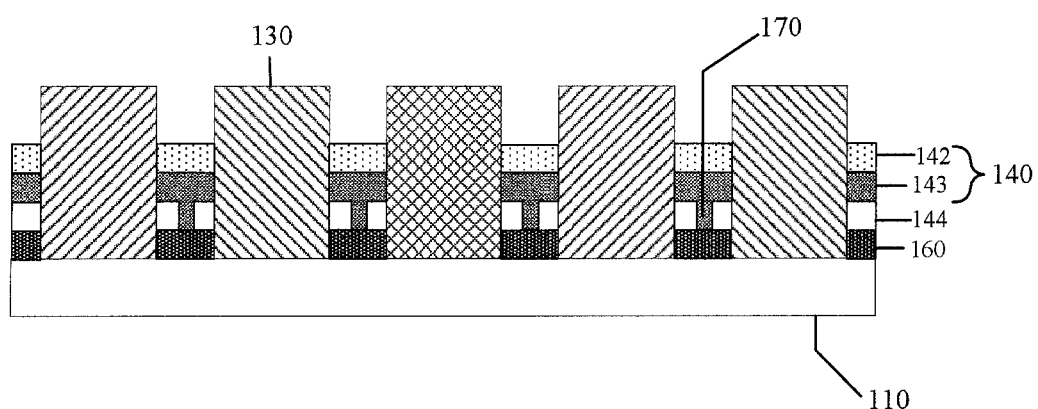
FIG. 2a is a structural cross sectional view of the optical touch substrate shown in FIG. 1a taken along a direction A-A'.
Figure 2B:
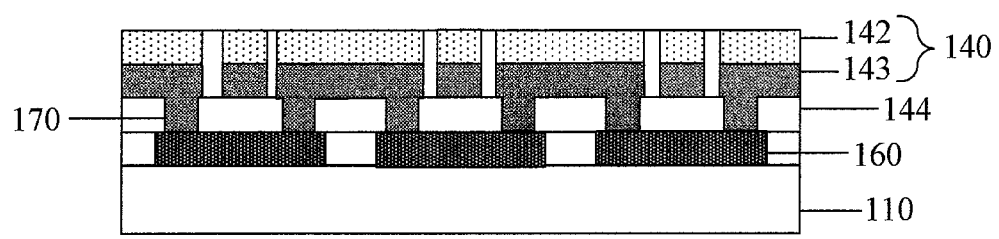
FIG. 2b is a structural cross sectional view of the optical touch substrate shown in FIG. 1a taken along a direction B-B'.

In an embodiment, the above optical touch substrate according to the embodiments of the present disclosure acts as an array substrate, as shown in FIGS. 2a and 2b, and the conductive layer 143 is located between the light sensing layer 142 and the base substrate 110. As such, it avoids the conductive layer 143 from blocking light to be irradiated to a touch side of the light sensing layer 142, while the conductive layer 143 can shield light, which comes from the side of the conductive layer 143 opposite to the light sensing layer 142, from entering the light sensing layer 142. For example, in a liquid crystal display panel, the light emitted from a back light source may be blocked or shielded by the conductive layer 143, and in an organic electroluminescent display panel, the light emitted from organic light emitting pixels may be blocked or shielded by the conductive layer 143.

In an embodiment, if the above optical touch substrate according to the embodiments of the present disclosure acts as an array substrate, it further comprises a thin film transistor between the conductive layer and the base substrate, a data line extending in a column direction and a gate line extending in a row direction, and an orthographic projection of the light shielding matrix onto the base substrate covers or overlaps orthographic projections of the data line, the gate line and the thin film transistor onto the base substrate.

In order to simplify manufacture process and save production cost, when the above optical touch substrate according to the present disclosure acts as an array substrate, in an embodiment, the connection line is located in the same layer as the gate line if the first optical touch electrodes are located in the same layer as the second optical touch electrodes, and the first optical touch electrodes extend in a row direction and the second optical touch electrodes extend in a column direction. In this way, it is not required to add any additional processes for preparing the array substrate, and the connection line and the gate line may be formed through only one patterning process, thereby saving the production cost and increasing the product added value.

Alternatively, in another embodiment, if the first optical touch electrodes are located in the same layer as the second optical touch electrodes, and the first optical touch electrodes extend in a column direction and the second optical touch electrodes extend in a row direction, then the connection line is located in the same layer as the data line. In this way, it is not required to add any additional processes for preparing the array substrate, and the connection line and the data line may be formed through only one patterning process, thereby saving the production cost and increasing the product added value.

In order to ensure that the connection line of the first optical touch sub-electrode does not affect the aperture ratio, the pattern of the connection line is generally arranged within a region where the pattern of the light shielding matrix is located, i.e., an orthographic projection of the connection line onto the base substrate is located within a region where an orthographic projection of the light shielding matrix onto the base substrate is located.

Figure 2C:
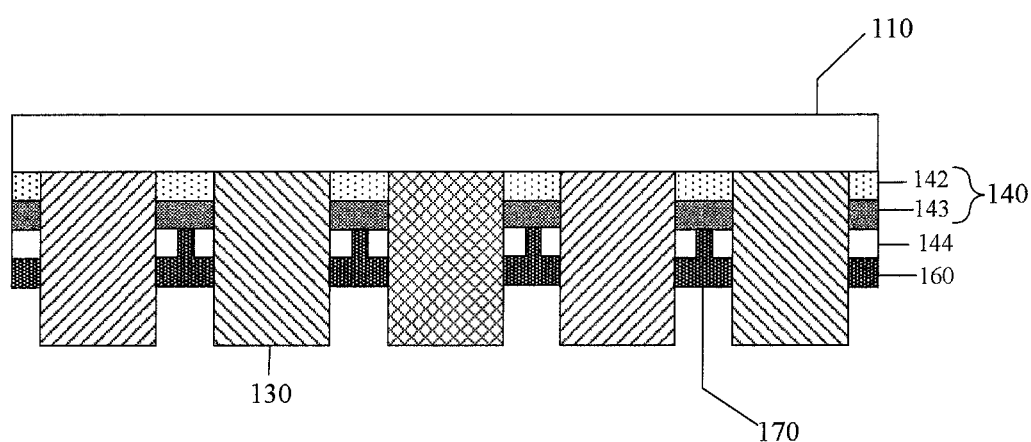
FIG. 2c is another structural cross sectional view of the optical touch substrate shown in FIG. 1a taken along the direction A-A'.
Figure 2D:
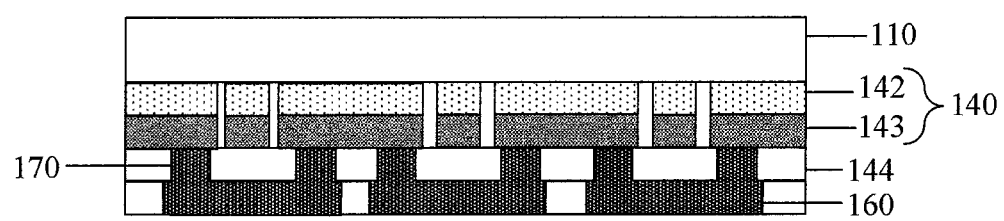
FIG. 2d is another structural cross sectional view of the optical touch substrate shown in FIG. 1a taken along the direction B-B'.

In another embodiment, the above optical touch substrate according to the present disclosure acts as a color film substrate, as shown in FIGS. 2c and 2d, the light sensing layer 142 is located between the conductive layer 143 and the base substrate 110. In this way, it avoids the conductive layer 143 from blocking light to be irradiated to a touch side of the light sensing layer 142, while the conductive layer 143 can shield light, which comes from the side of the conductive layer 143 opposite to the light sensing layer 142, from entering the light sensing layer 142. For example, in a liquid crystal display panel, the light emitted from a back light source may be blocked or shielded by the conductive layer, and in an organic electroluminescent display panel, the light emitted from organic light emitting pixels may be blocked or shielded by the conductive layer. If the above optical touch substrate according to the present disclosure acts as a color film substrate, then in an embodiment, it further comprises a color filter layer (not shown) located at a side of the base substrate 110 facing the conductive layer 143 and located within the pixel regions 130.

According to the same inventive concept, an embodiment of the present disclosure provides an in-cell touch panel comprising the above optical touch substrate according to the embodiments of the present disclosure. The principle of the in-cell touch panel for addressing problems is similar to that of the optical touch substrate, therefore, the in-cell touch panel may be implemented with reference to the implementations of the above optical touch substrate, which will not be repeatedly described here.

According to the same inventive concept, an embodiment of the present disclosure provides a display device comprising the above in-cell touch panel according to the embodiments of the present disclosure. The display device may be a mobile phone, a tablet computer, a television set, a display, a notebook computer, a digital picture frame, a navigator and any other products or components having a display function. Other necessary constituent parts for the display device may be provided by those skilled in the art, therefore they will not be described here and they are not intended to limit the present disclosure. The display device may be implemented with reference to the implementation of the above in-cell touch panel, which will not be repeatedly described here.

The optical touch substrate, the in-cell touch panel and the display device according to the embodiments of the present disclosure comprise a base substrate, a light shielding matrix and a plurality of pixel regions defined by the light shielding matrix, the light shielding matrix comprises a plurality of first optical touch electrodes and a plurality of second optical touch electrodes arranged to cross each other, the first optical touch electrodes being insulated from the second optical touch electrodes, and at least one optical touch electrode of the plurality of first optical touch electrodes and the plurality of second optical touch electrodes comprises a light sensing layer and a conductive layer provided in a stacked manner; and a sensing signal on each optical touch electrode changes as an intensity of light irradiated to a corresponding light sensing layer changes. As such, touch positioning may be achieved by means of changing the intensity of light irradiated to the light sensing layer, it is possible to not only achieve a proximity touch function, but also achieve a remote touch function through optical positioning by a laser pointer. Therefore, it is more suitable for an application in a large sized display panel which is intended to be remotely controlled by a finger, in contrast to the resistive touch panel and the capacitive touch panel.

It will be apparent that various changes and modifications to the present disclosure may be made by those skilled in the art without departing from the spirit and scope of the present disclosure. Thus, if these changes and modifications to the present disclosure fall within the scope of the present disclosure and the equivalents thereof, then it is intended to include these changes and modifications in the present disclosure.

What is claimed is:

1. An optical touch substrate, comprising a base substrate, a light shielding matrix and a plurality of pixel regions defined by the light shielding matrix,
    wherein the light shielding matrix comprises a plurality of first optical touch electrodes and a plurality of second optical touch electrodes arranged to cross each other, the plurality of first optical touch electrodes being insulated from the plurality of second optical touch electrodes;
    wherein at least one first optical touch electrode of the plurality of first optical touch electrodes comprises a first light sensing layer and a first light shielding conductive layer provided in a stacked manner, or at least one second optical touch electrode of the plurality of second optical touch electrodes comprises a second light sensing layer and a second light shielding conductive layer provided in a stacked manner,
    wherein the first light shielding conductive layer is arranged to shield light, which comes from a side of the first light shielding conductive layer opposite to the first light sensing layer, from entering the first light sensing layer, or the second light shielding conductive layer is arranged to shield light, which comes from a side of the second light shielding conductive layer opposite to the second light sensing layer, from entering the second light sensing layer; and
    wherein the at least one first optical touch electrode is configured to generate a sensing signal which changes as an intensity of light irradiated to the first light sensing layer of the at least one first optical touch electrode changes, or the at least one second optical touch electrode is configured to generate a sensing signal which changes as an intensity of light irradiated to the second light sensing layer of the at least one second optical touch electrode changes.

2. The optical touch substrate according to claim 1, wherein the plurality of first optical touch electrodes are located in the same layer as the plurality of second optical touch electrodes; and
wherein some of the plurality of first optical touch electrodes comprises a plurality of first optical touch sub-electrodes independent from each other, the plurality of first optical touch sub-electrodes are arranged to be respectively spaced apart from the second optical touch electrodes,
wherein two first optical touch sub-electrodes, which belong to a same one of the plurality of first optical touch electrodes, of the plurality of first optical touch sub-electrodes are respectively located at two sides of a corresponding one of the plurality of second optical touch electrode, each of the two first optical touch sub-electrode comprises the first light shielding conductive layer, and the first light shielding conductive layer of one of the two first optical touch sub-electrodes and the first light shielding conductive layer of the other of the two first optical touch sub-electrodes are electrically connected to each other via a connection line in a bridging manner.

3. The optical touch substrate according to claim 2, further comprising an insulation layer located between the first light shielding conductive layer and the connection line, or between the second light shielding conductive layer and the connection line,
wherein the connection line is electrically connected to the first light shielding conductive layer or the second light shielding conductive layer via a via hole extending through the insulation layer.

4. The optical touch substrate according to claim 3, wherein the optical touch substrate is an array substrate, and the first light shielding conductive layer is located between the first light sensing layer and the base substrate, or the second light shielding conductive layer is located between the second light sensing layer and the base substrate.

5. The optical touch substrate according to claim 2, wherein an orthographic projection of the connection line onto the base substrate is located within a region where an orthographic projection of the light shielding matrix onto the base substrate is located.

6. The optical touch substrate according to claim 2, wherein the optical touch substrate is an array substrate, and the first light shielding conductive layer is located between the first light sensing layer and the base substrate, or the second light shielding conductive layer is located between the second light sensing layer and the base substrate.

7. The optical touch substrate according to claim 1, wherein the first optical touch electrodes and/or the second optical touch electrodes each have a grid structure.

8. The optical touch substrate according to claim 7, wherein the optical touch substrate is an array substrate, and the first light shielding conductive layer is located between the first light sensing layer and the base substrate, or the second light shielding conductive layer is located between the second light sensing layer and the base substrate.

9. The optical touch substrate according to claim 1, wherein a material of the first light shielding conductive layer or the second light shielding conductive layer is an opaque metallic material.

10. The optical touch substrate according to claim 9, wherein the first light sensing layer or the second light sensing layer includes block structures distributed uniformly and spaced apart from each other.

11. The optical touch substrate according to claim 9, wherein an orthographic projection of the first light shielding conductive layer onto the base substrate overlaps an orthographic projection of the first light sensing layer onto the base substrate, or
an orthographic projection of the second light shielding conductive layer onto the base substrate overlaps an orthographic projection of the second light sensing layer onto the base substrate.

12. The optical touch substrate according to claim 11, wherein the optical touch substrate is an array substrate, and the first light shielding conductive layer is located between the first light sensing layer and the base substrate, or the second light shielding conductive layer is located between the second light sensing layer and the base substrate.

13. The optical touch substrate according to claim 9, wherein the optical touch substrate is an array substrate, and the first light shielding conductive layer is located between the first light sensing layer and the base substrate, or the second light shielding conductive layer is located between the second light sensing layer and the base substrate.

14. The optical touch substrate according to claim 1, wherein the optical touch substrate is an array substrate, and the first light shielding conductive layer is located between the first light sensing layer and the base substrate, or the second light shielding conductive layer is located between the second light sensing layer and the base substrate.

15. The optical touch substrate according to claim 14, further comprising:
a thin film transistor between the first light shielding conductive layer and the base substrate or between the second light shielding conductive layer and the base substrate;
a data line extending in a column direction; and
a gate line extending in a row direction,
wherein an orthographic projection of the light shielding matrix onto the base substrate covers orthographic projections of the data line, the gate line and the thin film transistor onto the base substrate.

16. The optical touch substrate according to claim 15, wherein,
when the plurality of first optical touch electrodes are located in the same layer as the plurality of second optical touch electrodes, and the plurality of first optical touch electrodes extend in the row direction and the plurality of second optical touch electrodes extend in the column direction, the connection line is located in the same layer as the gate line; or
when the plurality of first optical touch electrodes are located in the same layer as the plurality of second optical touch electrodes, and the plurality of first optical touch electrodes extend in the column direction and the plurality of second optical touch electrodes extend in the row direction, the connection line is located in the same layer as the data line.

17. The optical touch substrate according to claim 1, wherein the first optical touch electrodes and/or the second optical touch electrodes each have a strip structure.

18. The optical touch substrate according to claim 1, wherein the optical touch substrate is a color film substrate, and
- the first light sensing layer is located between the first light shielding conductive layer and the base substrate, or the second light sensing layer is located between the second light shielding conductive layer and the base substrate.

19. An in-cell touch panel, comprising the optical touch substrate according to claim 1.

20. A display device, comprising the in-cell touch panel according to claim 19.

\* \* \* \* \*